US011209096B2

(12) United States Patent
Patterson (10) Patent No.: US 11,209,096 B2
(45) Date of Patent: Dec. 28, 2021

(54) BILATERAL AND THROTTLING DIRECTIONAL CONTROL VALVE

(71) Applicant: Proserv Operations, Inc., Houston, TX (US)

(72) Inventor: Andy Patterson, Katy, TX (US)

(73) Assignee: Proserv Operations, Inc., Houston, TX (US)

( * ) Notice: Subject to any disclaimer, the term of this patent is extended or adjusted under 35 U.S.C. 154(b) by 30 days.

(21) Appl. No.: 16/684,187

(22) Filed: Nov. 14, 2019

(65) Prior Publication Data
US 2020/0158253 A1  May 21, 2020

Related U.S. Application Data

(60) Provisional application No. 62/769,397, filed on Nov. 19, 2018.

(51) Int. Cl.
*F16K 11/07* (2006.01)
*F16K 31/122* (2006.01)
*F16K 11/044* (2006.01)

(52) U.S. Cl.
CPC ........ *F16K 31/1221* (2013.01); *F16K 11/044* (2013.01); *F16K 11/0712* (2013.01); *F16K 11/0716* (2013.01); *Y10T 137/86702* (2015.04)

(58) Field of Classification Search
CPC ....... Y10T 137/86702; Y10T 137/8663; E21B 33/0355; F16K 11/044; F16K 11/0716
See application file for complete search history.

(56) References Cited

U.S. PATENT DOCUMENTS

| 402,600 A | 5/1889 | Kemp |
|---|---|---|
| 1,654,642 A | 1/1928 | Geissinger |

(Continued)

FOREIGN PATENT DOCUMENTS

| CH | 469928 A | 3/1969 |
|---|---|---|
| DE | 102014224979 A1 | 6/2016 |

OTHER PUBLICATIONS

PCT International Search Report and Written Opinion dated Nov. 14, 2019, for International Application No. PCT/US2019/046323, 13 pages.

(Continued)

*Primary Examiner* — Robert K Arundale
(74) *Attorney, Agent, or Firm* — Patterson + Sheridan, LLP (57) ABSTRACT

A valve, includes a valve body comprising a bore having a first seal plate and a second, opposed seal plate, therein, the first seal plate including a first seal plate opening therethrough, a first port in fluid communication with the bore through the first seal plate opening, a second port in fluid communication with the bore, a third port in fluid communication with the bore, the second port disposed intermediate of the first and third ports, a bilateral sealing assembly comprising a tubular body having a first outer surface adjacent a first end face thereof, and a second outer surface adjacent a second end thereof opposite of the first end face. The bore includes a first inner cylindrical surface extending inwardly thereof from a first end thereof and a first tapered surface angled away from the first inner cylindrical surface, and a first inner cylindrical surface extending inwardly thereof from a first end thereof and a first tapered surface angled away from the first inner cylindrical surface, and with the first surface of the bilateral sealing sleeve in contact with the first seal plate, a first annular gap between the first outer (Continued)

surface of the bilateral sealing assembly and the first inner cylindrical surface.

23 Claims, 8 Drawing Sheets (56) References Cited

U.S. PATENT DOCUMENTS

| | | | |
|---|---|---|---|
| 2,140,735 A | 12/1938 | Gross | |
| 2,311,851 A | 2/1943 | McClure | |
| 2,560,841 A | 7/1951 | Bishop | |
| 2,605,108 A | 7/1952 | Stephens | |
| 2,685,296 A | 8/1954 | Boosman | |
| 2,729,226 A | 1/1956 | Jones | |
| 2,799,523 A | 7/1957 | Parker | |
| 2,811,979 A | 11/1957 | Presnell | |
| 2,821,972 A | 2/1958 | Banker | |
| 2,847,027 A | 8/1958 | Kumpman | |
| 2,862,520 A | 12/1958 | Cordova | |
| 2,867,463 A | 1/1959 | Snider | |
| 2,892,644 A | 6/1959 | Collins | |
| 2,906,290 A | 9/1959 | Harding et al. | |
| 2,973,746 A | 3/1961 | Jupa | |
| 3,022,794 A | 2/1962 | Pippenger | |
| 3,114,391 A | 12/1963 | Kurtz | |
| 3,145,723 A | 8/1964 | Chorkey | |
| 3,189,049 A | 6/1965 | Carlson | |
| 3,219,060 A | 11/1965 | Pearl et al. | |
| 3,225,786 A | 12/1965 | Elliott | |
| 3,279,805 A | 10/1966 | Quinson | |
| 3,316,930 A | 5/1967 | Garduer | |
| 3,352,394 A | 11/1967 | Longshore | |
| 3,421,533 A | 1/1969 | Conn | |
| 3,474,828 A | 10/1969 | Wheeler et al. | |
| 3,485,225 A | 12/1969 | Bailey et al. | |
| 3,533,431 A | 10/1970 | Kuenzel et al. | |
| 3,536,085 A | 10/1970 | Taplin | |
| 3,540,695 A | 11/1970 | Taylor | |
| 3,574,311 A * | 4/1971 | Fairbanks | F15B 13/04 137/625.68 |
| 3,587,647 A | 6/1971 | Walters | |
| 3,598,148 A | 8/1971 | Kroffke | |
| 3,635,436 A | 1/1972 | Tillman | |
| 3,662,950 A | 5/1972 | McIntosh et al. | |
| 3,683,694 A | 8/1972 | Granberg | |
| 3,749,122 A | 7/1973 | Gold | |
| 3,797,525 A | 3/1974 | Lieser | |
| 3,913,620 A | 10/1975 | Pauliukonis | |
| 3,949,645 A | 4/1976 | Masclet | |
| 4,011,892 A * | 3/1977 | Kowalski | E21B 34/04 137/625.66 |
| 4,220,174 A | 9/1980 | Spitz | |
| 4,240,634 A | 12/1980 | Wiczer | |
| 4,253,481 A | 3/1981 | Sarlls, Jr. | |
| 4,263,938 A | 4/1981 | Peters | |
| 4,281,677 A | 8/1981 | Hoffman | |
| 4,336,946 A | 6/1982 | Wheeler | |
| 4,396,071 A | 8/1983 | Stephens | |
| 4,444,216 A | 4/1984 | Loup | |
| 4,457,489 A * | 7/1984 | Gilmore | F16L 37/28 137/596.18 |
| 4,475,568 A | 10/1984 | Loup | |
| 4,491,154 A | 1/1985 | Peters | |
| 4,493,335 A | 1/1985 | Watson | |
| 4,554,940 A | 11/1985 | Loup | |
| 4,793,590 A | 12/1988 | Watson | |
| 4,856,557 A | 8/1989 | Watson | |
| 4,877,057 A | 10/1989 | Christensen | |
| 4,887,643 A * | 12/1989 | Tomlin | E21B 33/0355 137/625.66 |
| 4,890,645 A | 1/1990 | Andersen | |
| 4,968,197 A | 11/1990 | Chen | |
| 5,035,265 A | 7/1991 | Chen | |
| 5,069,240 A | 12/1991 | Kurkjian, Jr. | |
| 5,190,078 A | 3/1993 | Stoll et al. | |
| 5,222,521 A | 6/1993 | Kihlberg | |
| 5,301,637 A | 4/1994 | Blount | |
| 5,771,931 A * | 6/1998 | Watson | E21B 33/0355 137/236.1 |
| 5,778,918 A * | 7/1998 | McLelland | E21B 33/0355 137/15.02 |
| 5,797,431 A | 8/1998 | Adams | |
| 5,901,749 A | 5/1999 | Watson | |
| 6,041,804 A | 3/2000 | Chatufale | |
| 6,257,268 B1 | 7/2001 | Hope et al. | |
| 6,264,206 B1 | 7/2001 | Hashizawa et al. | |
| 6,296,008 B1 | 10/2001 | Boyer et al. | |
| 6,318,400 B1 | 11/2001 | Hope et al. | |
| 6,382,256 B2 | 5/2002 | Kim et al. | |
| 6,520,478 B1 | 2/2003 | Hope et al. | |
| 6,523,613 B2 | 2/2003 | Rayssiguier et al. | |
| 6,651,696 B2 | 11/2003 | Hope et al. | |
| 6,668,861 B2 | 12/2003 | Williams | |
| 6,702,024 B2 | 3/2004 | Neugebauer | |
| 6,843,266 B2 | 1/2005 | Hope et al. | |
| 6,901,960 B2 | 6/2005 | Roberts et al. | |
| 6,983,803 B2 | 1/2006 | Watson et al. | |
| 7,000,890 B2 | 2/2006 | Bell et al. | |
| 7,073,590 B2 | 7/2006 | Neugebauer et al. | |
| 7,159,605 B2 | 1/2007 | Thrash, Jr. et al. | |
| 7,438,086 B2 | 10/2008 | Bento et al. | |
| 7,520,297 B2 | 4/2009 | Bell et al. | |
| 7,628,170 B2 | 12/2009 | Kok-Hiong et al. | |
| 7,784,553 B2 | 8/2010 | Moreno | |
| 7,959,161 B2 | 6/2011 | Seki et al. | |
| 8,052,119 B2 | 11/2011 | Numazaki et al. | |
| 8,245,729 B2 | 8/2012 | Zub | |
| 8,246,055 B2 | 8/2012 | Asplund et al. | |
| 8,342,202 B2 | 1/2013 | Nishio et al. | |
| 8,397,742 B2 | 3/2013 | Thrash et al. | |
| 8,408,244 B2 | 4/2013 | Gilcher | |
| 8,453,678 B2 | 6/2013 | Neff et al. | |
| 8,469,059 B1 | 6/2013 | Forst | |
| 8,474,792 B2 | 7/2013 | Kubo et al. | |
| 9,121,244 B2 | 9/2015 | Loretz et al. | |
| 9,297,462 B2 | 3/2016 | Hattori et al. | |
| 9,334,946 B1 | 5/2016 | Mason | |
| 9,354,638 B2 | 5/2016 | Rebreanu et al. | |
| 9,394,758 B2 * | 7/2016 | Landrith, II | E21B 34/04 |
| 9,422,783 B2 * | 8/2016 | Gustafson | E21B 33/064 |
| 9,423,031 B2 | 8/2016 | Weintraub et al. | |
| 9,874,282 B2 | 1/2018 | Wetzel et al. | |
| 2004/0047748 A1 | 3/2004 | Roberts et al. | |
| 2004/0173976 A1 | 9/2004 | Boggs | |
| 2004/0262007 A1 | 12/2004 | Neugebauer et al. | |
| 2005/0028864 A1 | 2/2005 | Thrash et al. | |
| 2005/0067031 A1 | 3/2005 | Lee | |
| 2006/0137744 A1 | 6/2006 | Anastas | |
| 2006/0237064 A1 | 10/2006 | Benson | |
| 2007/0000544 A1 | 1/2007 | Thompson | |
| 2007/0069576 A1 | 3/2007 | Suzuki | |
| 2007/0113906 A1 | 5/2007 | Sturman et al. | |
| 2010/0044605 A1 | 2/2010 | Veilleux | |
| 2010/0140881 A1 | 6/2010 | Matsuo | |
| 2010/0154896 A1 | 6/2010 | Thrash, Jr. et al. | |
| 2010/0243084 A1 | 9/2010 | Yoshioka et al. | |
| 2011/0253240 A1 | 10/2011 | Otto et al. | |
| 2012/0292550 A1 | 11/2012 | Meek | |
| 2013/0032222 A1 | 2/2013 | Bresnahan | |
| 2013/0037736 A1 | 2/2013 | Bresnahan | |
| 2013/0146303 A1* | 6/2013 | Gustafson | E21B 33/064 166/379 |
| 2013/0181154 A1 | 7/2013 | Robison et al. | |
| 2013/0319557 A1* | 12/2013 | Smith, III | F16K 1/42 137/625.66 |
| 2014/0116551 A1 | 5/2014 | Smith | |
| 2014/0377111 A1 | 12/2014 | Bagagli et al. | |
| 2015/0060715 A1 | 3/2015 | Hoang | |
| 2015/0152959 A1 | 6/2015 | Mangiagli et al. | |
| 2015/0191996 A1 | 7/2015 | Weintraub | |
| 2015/0191997 A1 | 7/2015 | Weintraub et al. | |
| 2015/0276072 A1 | 10/2015 | Rebreanu et al. | |
| 2015/0276083 A1 | 10/2015 | Druhan et al. | |

(56) References Cited

U.S. PATENT DOCUMENTS

| | | |
|---|---|---|
| 2015/0369002 A1 | 12/2015 | Patterson |
| 2016/0103456 A1 | 4/2016 | Cho et al. |
| 2016/0123478 A1 | 5/2016 | Wetzel et al. |
| 2016/0230900 A1 | 8/2016 | Schulz et al. |
| 2016/0258531 A1 | 9/2016 | Ito et al. |
| 2016/0258537 A1 | 9/2016 | Heiderman et al. |
| 2017/0037984 A1 | 2/2017 | Frippiat et al. |
| 2017/0097100 A1 | 4/2017 | Patterson |
| 2017/0175916 A1 | 6/2017 | Huynh et al. |
| 2017/0189730 A1 | 7/2017 | Ernfjall |
| 2017/0220054 A1 | 8/2017 | Zhu et al. |
| 2017/0241563 A1 | 8/2017 | Simpson |
| 2017/0260831 A1 | 9/2017 | Green |
| 2017/0314689 A1 | 11/2017 | Osterbrink et al. |
| 2017/0370481 A1 | 12/2017 | Glazewski |
| 2018/0073652 A1 * | 3/2018 | Weintraub |
| 2018/0231135 A1 * | 8/2018 | Matteucci ........... F16K 31/1221 |
| 2020/0096114 A1 * | 3/2020 | Stetzer .................... F16K 1/422 |

OTHER PUBLICATIONS

PCT International Search Report and Written Opinion dated Dec. 1, 2017, for International Application No. PCT/US2017/061567.
PCT International Search Report and Written Opinion dated Jan. 31, 2018, for International Application No. PCT/US2017/051550.
PCT International Search Report and Written Opinion dated Jun. 23, 2015, for International Application No. PCT/US2014/062114.

* cited by examiner

BILATERAL AND THROTTLING DIRECTIONAL CONTROL VALVE

CROSS-REFERENCE TO RELATED APPLICATIONS

This application claims benefit of U.S. provisional patent application Ser. No. 62/769,397, filed Nov. 19, 2018, which is herein incorporated by reference.

BACKGROUND

The present disclosure relates to the field of valves, more particularly to fluid operated control valves used in a fluid control circuit to selectively apply a control pressure to, or vent pressure from, a fluid operated control circuit component, including a component to be controlled by the fluid circuit.

One known fluid operated control valve is a 2 position, 3 way valve, wherein a valve body includes a function port fluidly connected, through a fluid control circuit, to a fluid operated circuit component downstream of the valve, a source pressure port fluidly connected to a supply of a control fluid at a user specified pressure as required for operation, control, or both, of a fluid circuit component with which the valve is fluidly connected through the function port, and a vent port through which fluid and pressure in the function port can be selectively relieved. In a normally open valve construct, a sleeve shaped member having opposed open ends in fluid communication with each other through the hollow interior thereof is movably operable by a control piston to be positioned in a first position whereby one open end thereof is positioned against a sealing surface spaced from and facing the function port, to allow fluid communication therethrough between the function port and the source port, and operable to be positioned in another position whereby a different one of the opposed open ends thereof is positioned against a sealing surface extending circumferentially around the function port and thereby prevent fluid communication therethrough between the function port and the source port and allow fluid communication therethrough between the vent port and the function port. By switching the pressure and vent connections, the valve will operate as a normally closed valve. One such valve is shown in FIG. 1 of U.S. Pat. No. 5,771,931 and described therein.

In the above described valve, the maximum gap between an end of the sleeve and an adjacent facing sealing surface is on the order of, or less than, the annular gap between the outer surface of the sleeve and the surrounding inner surface of the valve, in the 5,771,931 valve, the inner diameter of the cage member. When the valve is configured in a normally closed configuration so that the function port communicates with the vent port when the sleeve is biased against the sealing surface distal to the function port, when the valve operates to change from the closed state to an open state, as the end of the sleeve distal to the function port is pulled away from the sealing surface distal to the function port, the restriction on the flow area through the valve is the cross-sectional area of a circumferential gap between the end of the sleeve distal to the function port and the adjacent sealing surface against which that end of the sleeve is selectively sealable, and this area monotonically increases directly as a function of the increase in distance between the end of the sleeve facing the sealing surface distal to the function port, and sealing surface distal to the functional port. Likewise, the opening area into the interior of the sleeve at the circumferential gap between the end of the sleeve facing the function port and the circumferential sealing surface surrounding the sealing port simultaneously monotonically decreases as the end of the sleeve facing the function port approaches the circumferential sealing surface surrounding the function port. As a result, a sudden increase in pressure and flow will occur as the fluid at the source pressure is rapidly exposed to and flows through the valve to the function port as the sleeve moves away from the sealing surface distal to the function port and rapidly increases the available flow and pressure communication area between the source and function ports of the valve, causing a damaging pressure spike in the line connected to the function port and any component fluidly connected thereto. Additionally, if fluid is flowing through valve, for example when the valve is closing against maximum flow therethrough and pressure drop thereacross, a pressure spike is instantaneously experienced upstream of the valve.

SUMMARY

A valve includes a valve body comprising a bore having a first seal plate and a second, opposed seal plate, therein, the first seal plate including a first seal plate opening therethrough, a first port in fluid communication with the bore through the first seal plate opening, a second port in fluid communication with the bore, a third port in fluid communication with the bore, the second port disposed intermediate of the first and third ports, a bilateral sealing assembly comprising a tubular body having a first outer surface adjacent a first end face thereof, and a second outer surface adjacent a second end thereof opposite of the first end face. The bore includes a first inner cylindrical surface extending inwardly thereof from a first end thereof and a first tapered surface angled away from the first inner cylindrical surface, and a second inner cylindrical surface extending inwardly thereof from a second end thereof and a second tapered surface angled away from the second inner cylindrical surface, and with the first surface of the bilateral sealing sleeve in contact with the first seal plate, a first annular gap between the first outer surface of the bilateral sealing assembly and the first inner cylindrical surface.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Herein, there is provided a 2 position, 3 way valve, wherein during changing the of the valve operating condition from an open to a closed position, or a closed to an open position, by moving a valve position or condition selection component therein, a relatively constant in cross-section flow area into, or from, the function port is maintained for at least a portion of the full stroke of the valve selection component, thereby throttling or restricting the flow therethrough and thereby allowing the pressure downstream of the valve an opportunity to become close to that of the source pressure as the valve is opened. In like fashion, if the valve is operated change from an open condition to a closed condition while fluid is passing therethrough to or from function port, as the valve selection component moves to the closed position the constant cross sectional flow area is present as the valve comes into the closed condition, thereby limiting the flow therethrough and preventing or ameliorating pressure spiking in lines or components connected to the source port.

Herein, the valve selection component is a sleeve (bilateral sealing assembly 156) with opposed open ends configured such that respective ones of the opposed ends thereof is selectively engageable against one of two sealing surfaces within the valve 10, and during switching of the valve between a valve closed position whereby a fluid component fluidly downstream of the valve is isolated from an operating or source pressure to a valve open position whereby the source fluid and pressure is flowed or communicated through the valve to the component fluidly downstream thereof, the maximum area through which fluid can flow through a portion of the valve is maintained constant over at least a portion of the opening period or stroke of the sleeve, thereby throttling the application of pressure and the fluid flow therethrough to reduce or eliminate pressure spiking in the flow lines and the component(s) downstream of the valve 10. In same fashion, the maximum area through which fluid can flow through a portion of the valve is maintained constant over at least a portion of the closing period or stroke of the sleeve, thereby throttling the fluid flow therethrough to reduce or eliminate pressure spiking in the flow lines and the component(s) upstream of the valve 10. The valve may be configured such that only one of the opening and closing, or both, will experience the constant flow area as the valve switches between operating statuses.

Figure 1:
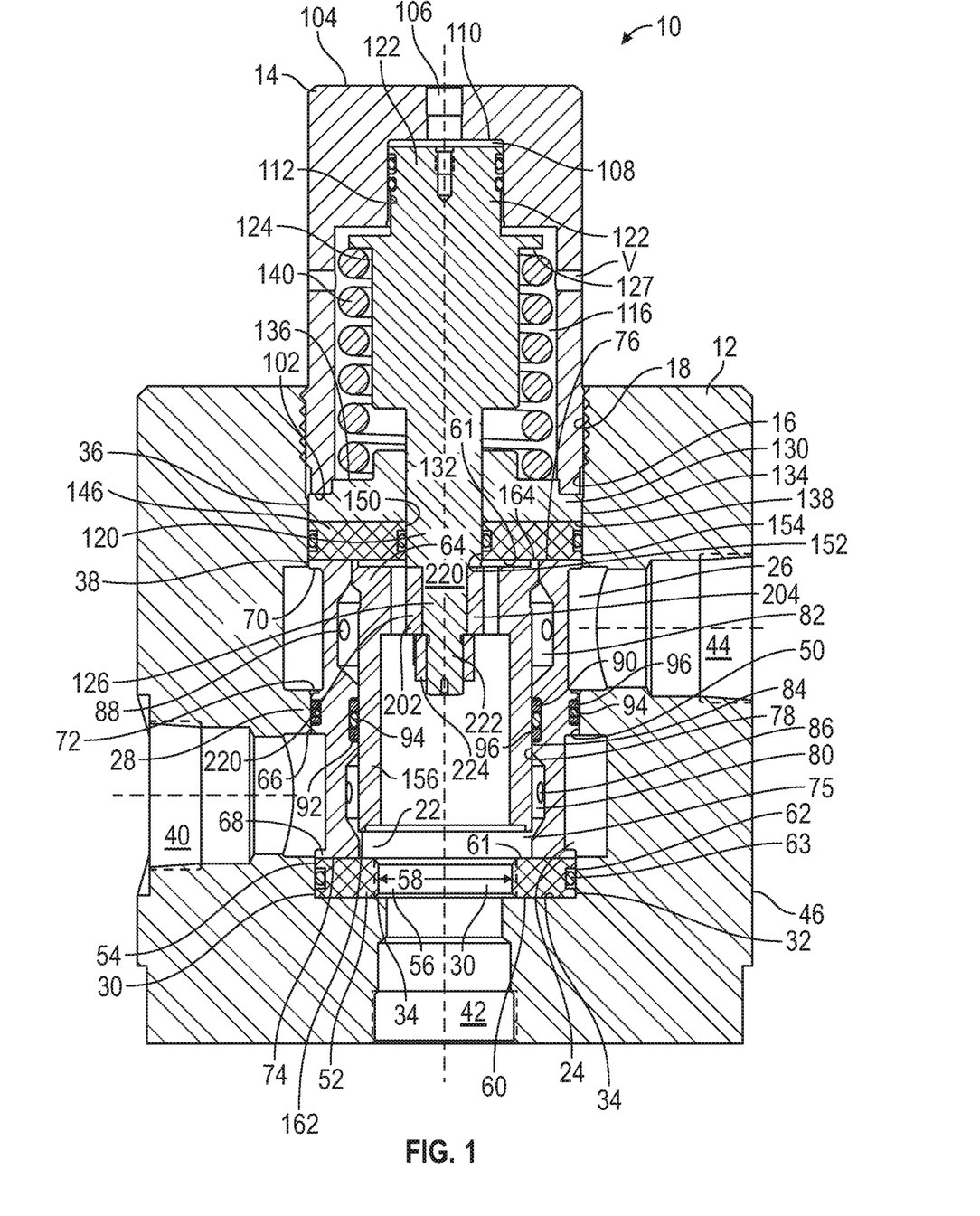
FIG. 1 is a full cross-sectional view of the valve of FIG. 1A, with the valve in the open position.
Figure 2:
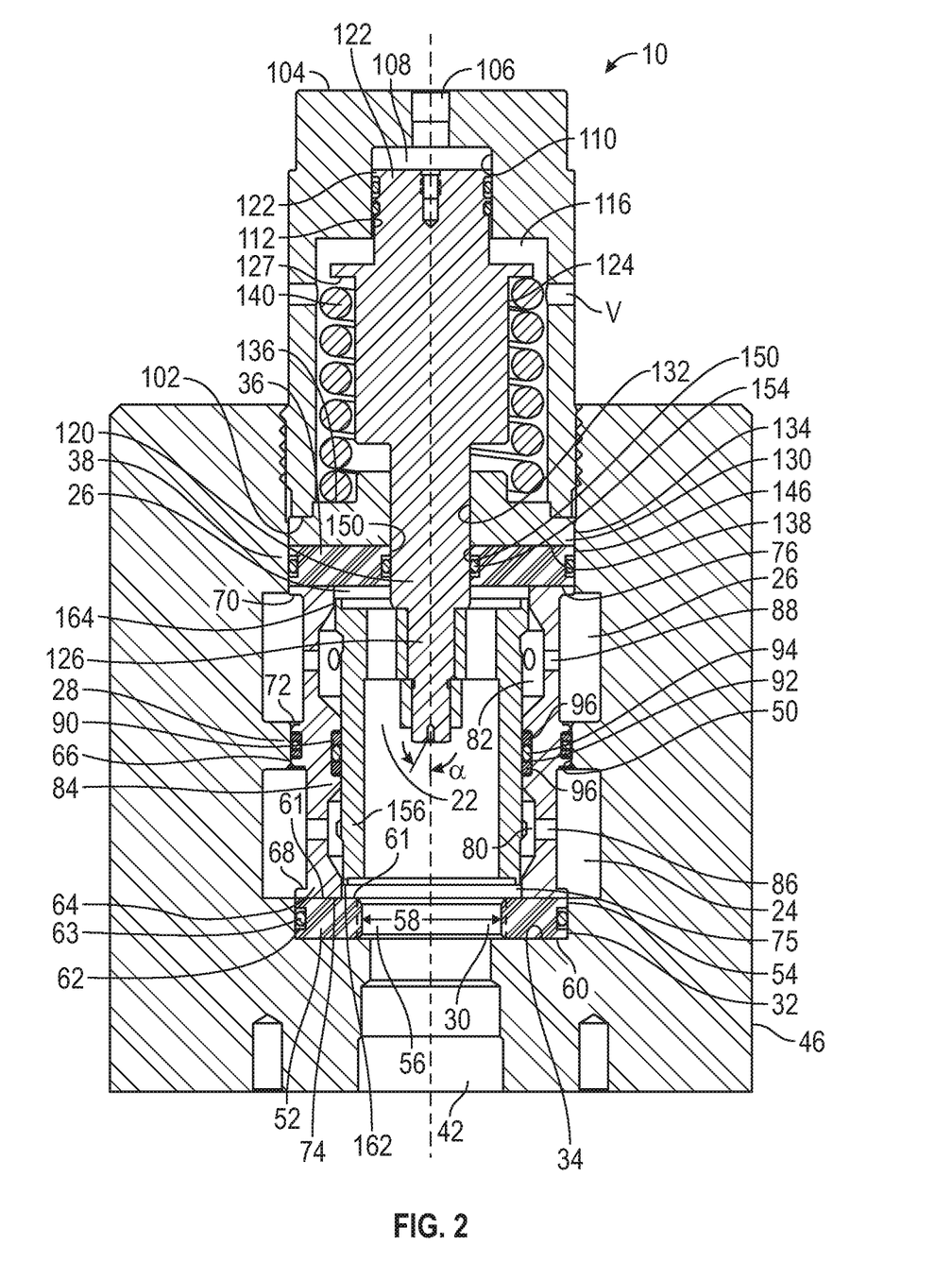
FIG. 2 is a full cross-sectional view of the valve of FIG. 1A, with the valve in an intermediate position between the open and closed position.
Figure 3:
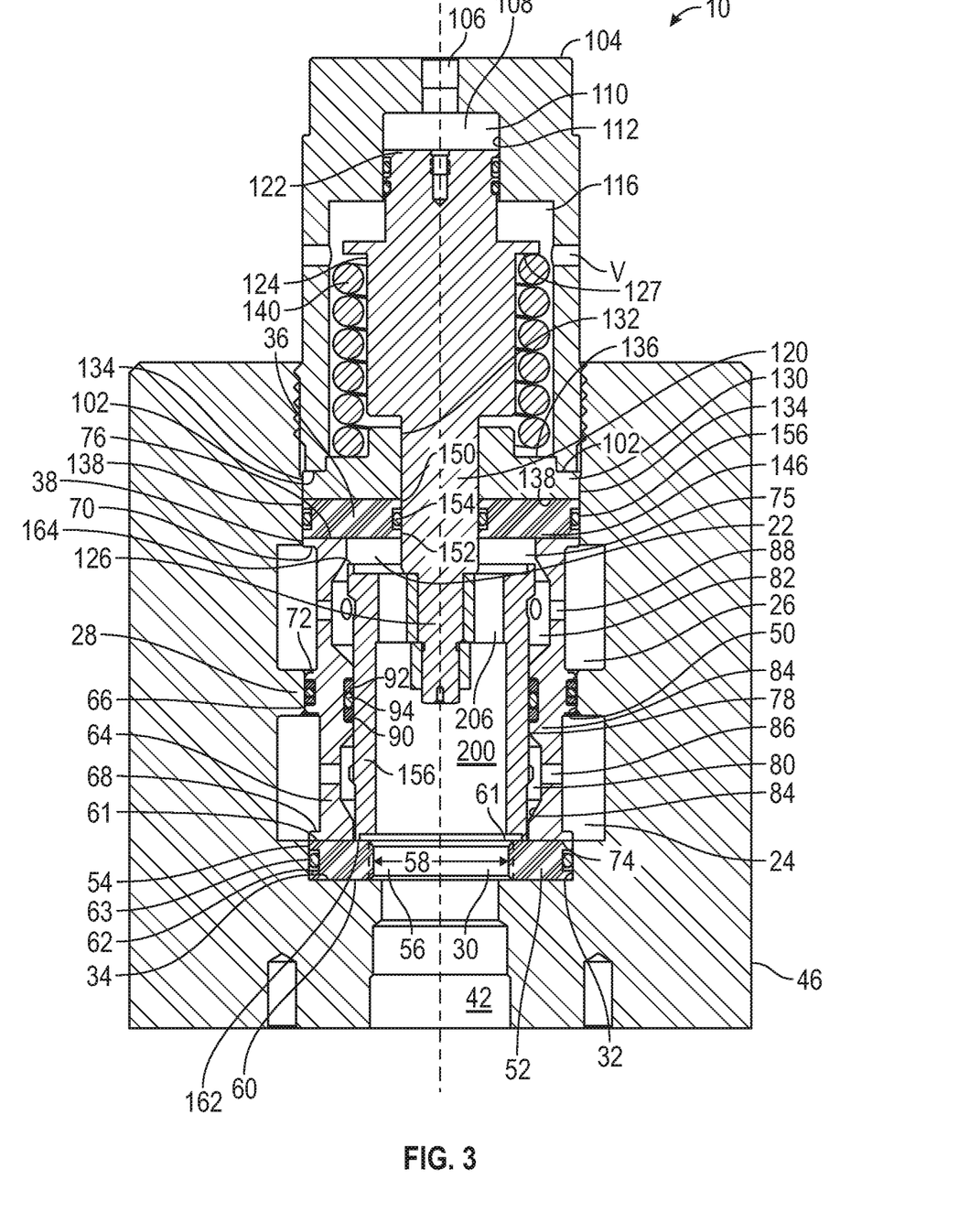
FIG. 3 is a sectional view of the valve of FIG. 1A, with the valve in the closed position.

In the valve 10 hereof described with respect to FIGS. 1 to 3, a first port 42 is connected to a downstream component to be fluidly controlled by the valve, and is hence herein denoted as the function port 42. Additionally, a second port 40 is described herein as either a vent or a supply port, and can be connected to either a vent (an ambient pressure at the exterior of the valve outlet) or to a source of fluid at a pressure sufficient to operate or control a fluid operated element in a fluid circuit downstream of the valve, and a third port 44 is likewise described as being connected to the other of the supply pressure or to a vent. However, for purposes of the initial description of the valve 10 hereof, the second port 40 is described as connected to supply pressure and is thus described as the supply port, and the third port 44 is described as connected to ambient and thus at the pressure of the valve-exterior environment, and is thus denoted as the vent port. In this configuration, as will be described herein, as shown in FIG. 1 the valve 10 is in a normally open position, e.g., it maintains the open position supplying supply pressure to a downstream component connected to the function port 42, unless actuated to the closed position. To actuate the valve to the closed position and cut off the supply of pressure to the downstream component, the sleeve (bilateral sealing assembly 156) is moved from the position thereof in FIG. 1 to that shown in FIG. 3. Thus, in a valve closed condition where supply pressure is supplied through second port 40, the end of the sleeve adjacent to the function port 42 abuts a sealing surface adjacent to the function port 42, and fluid in the function port 42 is in communication with the third port 44 serving as the vent port of the valve 10 through an interior passage of the sleeve as shown in FIG. 3. In the valve open position as shown in FIG. 1, the sleeve (bilateral sealing assembly 156) is positioned or moved such that the end thereof distal to the function port 42 engages a sealing surface within the valve body in opposition to the function port 42, and the source fluid at the second port 40 serving as the source port is directly communicable with the function port 42, and communication between the function port 42 and the third port 44 serving as the vent port is cut off from communication with the function port 42 and the second port 40 serving as the source port. During a portion of the travel of the sleeve (bilateral sealing assembly 156) between the second and third sealing surfaces, a relatively constant annular flow area is provided between the outer surface of the sleeve and the inner surface of the valve body or here a secondary valve component such as a cage located therein, such that as the sleeve (bilateral sealing assembly 156) is moving from the valve closed position thereof to the valve open position thereof, the area through which fluid at the source pressure can flow or communicate with the function port 42 remains constant over a portion of the movement distance of the sleeve to the fully open position, which occurs when the end of the sleeve (bilateral sealing assembly 156) distal to the function port 42 contacts the second sealing surface and communication of the function port 42 with the third port 44 serving as the vent port is cut off. This constant flow area condition also occurs as the sleeve (bilateral sealing assembly 156) is moving from the valve open position thereof to the valve closed position thereof. As a result, rapidly increasing flow volumes, and changes in pressure, as the valve opens or closes, are avoided, protecting downstream and upstream components from pressure spikes.

Figure 1A:
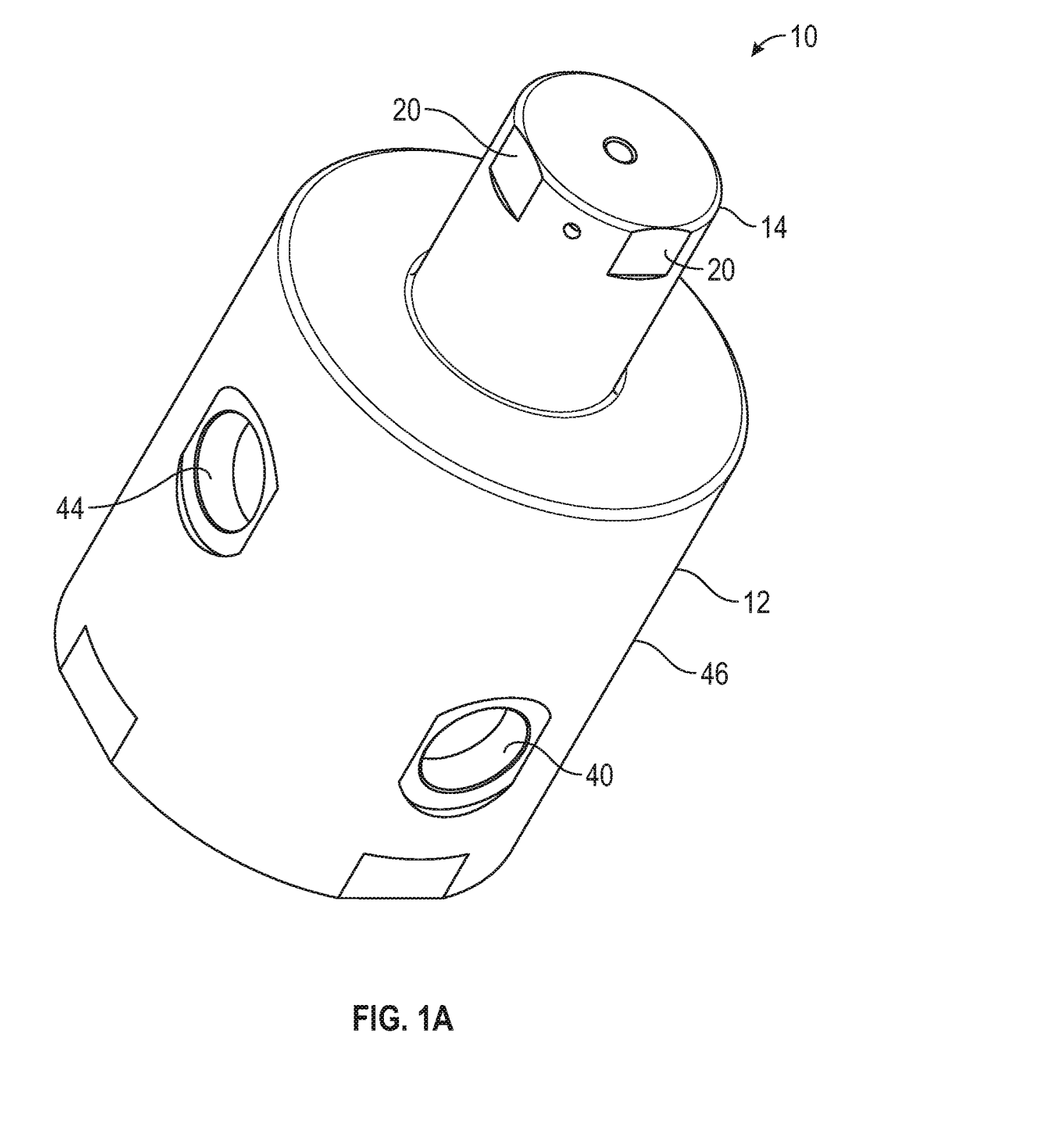
FIG. 1A is an isometric view of a two position three way valve.

Referring initially to FIGS. 1 and 1A, a two-position, three way valve 10 is shown having a valve body 12 and a control body 14, wherein the control body 14 is received and secured within a control body bore 16 in the valve body 12. Here, the control body bore 16 is threaded, and the control body is composed of a generally right cylindrical body having a first threaded portion 18 threaded into the threaded control body bore 16, and on the outer surface thereof adjacent to the distal end thereof are flats 20 for connection of a tool thereto to rotate the control body 14 to secure it in the valve body 12, or remove it from the valve body 12.

As shown in FIGS. 1 to 3, valve body 12 includes a central bore 22, which is bifurcated into a first connection bore 24 and a second connection bore 26 by an intermediate circumferential boss 28. A spacer 64 within which the bilateral sealing assembly 156 reciprocates is located within the central bore 22, and is bounded at its opposed ends by opposed first and second seal plates 52, 146 located at opposed ends of the central bore 22 which provide the opposed first and second sealing surfaces against which one of the opposed ends of the sleeve shaped bilateral sealing assembly 156 selectively seals. The spacer 64, also commonly referred to as a cage, includes two sets of openings (first and second sets of openings 86, 88) circumferentially spaced from one another and extending therethrough. In this embodiment, where valve 10 is used as a normally open valve, the first of sets of openings, first openings 86, extend through the spacer 64 and are in fluid communication with a second port 40 serving as the source fluid port or source port which is fluidly connected to a pressure source and allow fluid to flow therethrough between the second port 40 and the function port 42, and the second of the sets of openings, second openings 88, extend through the spacer 64 and are in fluid communication with a third port 44 here serving as the vent port, such that the fluid communication is maintained between the second port 40 acting as the source port and the function port 42 and cut-off between the function port 42 and the third port 44 acting as the vent port by the engagement of the sleeve-like bilateral sealing assembly 156 against the second seal plate 146. The sleeve-like bilateral sealing assembly 156 is received within the spacer 64 and biased by action of a spring 140 and a piston 122 to selectively seal one of the opposed first and second end faces 162, 164 thereof against one of the first and second seal plates 52, 146 providing opposed first and second sealing surfaces, to selectively enable communication of the function port 42 to one of the second and third ports 40, 44 serving in a normally open valve as the source and vent ports, respectively. In the embodiment of FIGS. 1 to 7, the valve is configured to be in a normally open position wherein the spring 140 biases the second end face 164 of the bilateral sealing assembly 156 against the second seal plate 146 to isolate the third port 44 connected to vent (vent port) from the function port 42, unless pressure sufficient to overcome the spring force is applied to the back side of the piston 122 to move the bilateral sealing assembly 156 in the direction of first seal plate 52 to allow communication of the function port 42 with the third port 44 serving as the vent port. The configuration of the valve 10 as normally open can be changed to normally closed by simply switching the fluid conduits or piping into the valve 10 from the fluid circuit to which the valve is connected, such that the source pressure piping is connected to third port 44, and the vent piping is connected to the second port 40, and thus the spring biases the bilateral sealing assembly 156 to seal against second seal plate 146 in the absence of pilot pressure applied to piston 122. A vent V extends through the wall of the control body 14, and thus the interior of the spring bore 115 is maintained at the ambient pressure surrounding the valve 10.

A first end 30 of the central bore 22 forms a counterbore extending inwardly of the valve body 12, which includes an outer circumferential wall 32 and an annular bore ledge 34. The second end 36 of the central bore 22 terminates at an inwardly extending boss forming a circumferential guide surface 38, into which the control body bore 16 opens. The second port 40 in the embodiment described serving as the source port extends from the first connection bore 24 adjacent to the first end 30 of the central bore 22 and through the valve body 12 to the exterior thereof. The second port 40 functioning here as the source port is configured to receive a nipple of a fluid connector therein, but alternatively, may be threaded to receive a threaded connector therein. In use of the valve 10, the second port 40 in this embodiment is connected to a fluid supply having a pressure sufficient to operate a fluid control component or maintain it in a desired operative condition supplied by a component of a fluid control circuit such as an accumulator or a valve connected to an accumulator, whereby the valve operates by positioning the bilateral sealing assembly 156 to control the fluid pressure present or communicable with the function port 42, and thus that supplied to a component of the fluid control circuit downstream of the function port 42. The function port 42 extends from the first end of the central bore 22 and first connection bore 24 and through the outer wall 46 of the valve body 12, and here is configured to receive a nipple of a fluid connector therein, but alternatively, may be threaded to receive a threaded connector therein. A third port 44, here described as functioning as the vent port is connected to a pressure sink having a pressure lower than that of the pressure of the source pressure, for example the surrounding ambient pressure around the valve 10, or a controlled lower pressure fluid line, and it extends from the second connection bore 26 through the outer wall 46 of the valve body 12, and is configured to receive a nipple of a fluid connector therein, but alternatively, may be threaded to receive a threaded connector therein, or may simply open into the ambient surrounding the valve 10. The inward terminus of the circumferential boss 28 forms a circumferential middle guide surface 50, which is generally a right cylindrical surface coaxial with the right cylindrical surface of the circumferential guide surface 38 and outer circumferential wall 32. The diameter or circumference of the circumferential guide surface 38 is greater than that of the circumferential middle guide surface 50 which is greater than that of the outer circumferential wall 32. The outer surface of the spacer 64 is sized to be received within and slid into the main bore 22 from the circumferential guide surface end thereof, and the different sizes of the circumferential surfaces of the main bore 22 ensure proper orientation of the spacer 64 within the valve 10.

The first seal plate 52 has a generally right cylindrical outer circumferential surface 54 and a central through bore 56 of a diameter 58 opening at opposed, coplanar first and second sides 60, 61 thereof, is received in the counterbore such that first side 60 thereof faces annular bore ledge 34 and the outer right cylindrical outer circumferential surface 54 thereof faces the outer circumferential wall 32, while second side 61 faces, in part, first connection bore 24. The cross sectional area of bore 56 is greater than the opening area of the function port 42 into the interior volume of the spacer 64 to allow unimpeded flow and communication of fluid through the function port 42 to or from the interior volume of the spacer 64 and the bilateral sealing assembly 156 of the valve 10. A seal groove 62 extends inwardly of right cylindrical outer circumferential surface 54, and a circumferential seal 63, such as an O-ring, is received therein and seals against the base of the seal groove and the surrounding outer circumferential wall 32 of the counterbore.

The spacer 64 is received within the central bore 22 and extends across both the second bore 26 and the first connection bore 24. Spacer 64 is a generally right annular tube shaped member having an outer wall 66 into which a first and a second circumferential recesses 68, 70 extend, defining a central circumferential boss 72, opposed annular first and second annular end faces 74, 76, and a central bore 75 bounded by an inner circumferential wall 78, into which spaced apart first and second inner circumferential recesses 80, 82, located directly radially inwardly of the first and a second circumferential recesses 68, 70, extend, defining an inner circumferential sleeve guide boss 84 extending inwardly of the bore thereof. The plurality of first openings 86 extend through the spacer 64 and permit fluid communication between the first circumferential recess 68 and first inner circumferential recess 80, and the first openings 86 are equally spaced circumferentially around the spacer 64. Similarly, the plurality of second openings 88 extend through the spacer 64 and permit fluid communication between the second circumferential recess 70 and second inner circumferential recess 82, and the second openings 88 are equally spaced circumferentially around the spacer 64. A seal groove 90 extends inwardly of, and circumferentially around, the inner surface of the inner circumferential sleeve guide boss 84 and a second seal groove 92 extends inwardly of, and circumferentially around, the outer surface of the central circumferential boss 72. A seal ring 94, such as an O-ring, and opposed backing rings 96 to either side of the seal ring 94, are provided are provided in the seal groove 90, whereby the seal ring 94 seals against the base of the seal groove 92 and the middle guide surface 50 of the circumferential boss 28. The inner circumferential sleeve guide boss 84 provides a guide surface to guide the motion of the bilateral sealing assembly 156 between the opposed first and second seal plates 52, 146, and also, in conjunction with the bilateral sealing assembly 156 and seal in the seal groove 90, provides isolation between the first and second internal recess 80, 82, and thus between the second and third ports 40, 44 serving as the source and vent ports. A seal ring 94, such as an O-ring, and opposed backing rings 96 to either side of the seal ring 94, are likewise provided in the second seal groove to seal between the base of the second seal groove 92 and the circumferential boss 28.

The second face 76 of the spacer 64 faces the second side 61 of first seal plate 52, and the outer surface 66 thereof adjacent the second face 76 thereof extends slightly within the circumference of, and is centered within the central bore 22 of the valve body by, the outer circumferential wall 32. The first face 74 of the spacer 64 faces away from the second face 76 and is located within the circumference of the guide surface 38 of the control body bore 16 of the valve body 12, and the cylindrical outer surface 66 of the spacer 64 spaced form, and between, the first and second faces 74, 76 thereof, extends through, and is centered in the valve body 22 by, the guide surface 38 of the control body bore 16.

Control body 14 includes the outer cylindrical surface 18 having the threads 16 thereon, and a first end 102 and a second end 104 at opposed ends of the outer cylindrical surface 100. The second end 104 includes a control pressure bore 106 extending from the outer surface of the control body 14 into a central bore 108 thereof. Central bore 108 includes a pilot piston bore 110 into which the control pressure bore 106 opens, and which is centrally located, in a diameter direction, in the control body 14, such that the outer cylindrical surface of the control body and the inner cylindrical surface 112 of the pilot piston bore 110, extend along the same center line, and a spring bore 116, having a larger inner diameter and circumference than that of the pilot piston bore 110, which extends from the inner terminus of the pilot piston bore 110 to the first end 102 of the control body 14. Alternatively, an actuator, such a solenoid controlled rod (not shown), may extend through the central bore 106 and contact or be connected to a piston 122 therein to control movement of the piston 122 to move the bilateral sealing assembly 156 therein.

A pilot 120 extends from and within the central bore 108 of the control body and into the central bore 22 of the valve body 12. Pilot 120 includes piston 122, having an outer generally right cylindrical surface slightly smaller in diameter and circumference than the diameter of the pilot piston bore 110, received within and moveable within the pilot piston bore 110, a spring guide portion 124 extending within the spring bore 116 from a spring flange 127, wherein the spring guide 124 has a larger diameter and circumference than the piston 122, and a guide rod 126 extending therefrom inwardly of central bore 22 of the valve body 12. A guide rod plate 130 is provided between the second end 104 of the control body 14 and the second seal plate 146, which in turn is located between the spacer 64 and the second end 104 of the control body. The guide rod plate 130 includes a central through aperture 132 through which guide rod 126 extends, an outer, generally right cylindrical, wall 134, a spring ledge 136 facing the spring bore 116 of the control body 14, and a second seal plate facing annular face 138. The spring 140 is provided around the outer circumference of the spring guide portion 124 of the pilot 120, the opposed ends of which bear against spring flange 127 of the pilot 120 and the spring ledge 136 of the guide rod plate 130. Spring 140 is configured to bias the spring flange 127, and thus the bilateral sealing assembly 156 attached to the pilot 120, in the direction away from the source port 42 of the valve body 12, to thereby maintain the valve 10 in the open position as will be further described herein.

Second seal plate 146 is, like first seal plate 52, a generally right annular disk, and differs from first seal plate 152 only in the configuration of the opening therethrough. In the second seal plate 146, the opening is configured as a piston rod 150 opening, having an inner circumferential surface 152 (FIG. 3) of a diameter or circumference slightly greater than the outer circumference of the piston rod 126, and a seal ring 154 (FIG. 3) extending circumferentially within a recess into the inner circumferential surface 152, and a back-up ring on either side thereof. In the embodiment shown, each of the seal plates is configured of an engineered material, such as PEEK, carbon filled PEEK, Viton, Teflon or another appropriate material. A circumferential groove likewise extends inwardly of the outer circumferential surface of the second seal plate 146, and a seal ring such as an O-ring provided therein seals the piston side thereof off from the main bore 22 side thereof.

Figure 4:
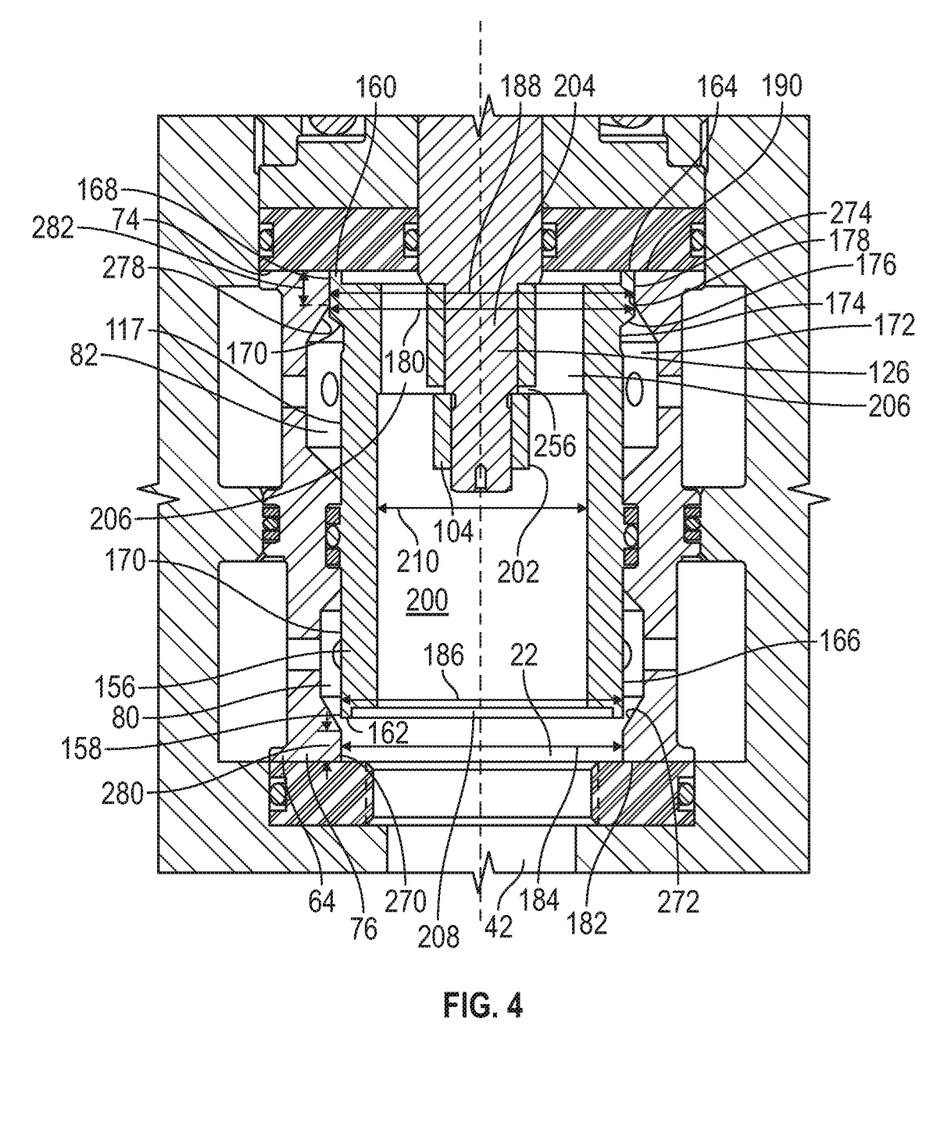
FIG. 4 is an enlarged sectional view of a portion of the valve, in the open position.

The bilateral sealing assembly 156 is connected to the end of piston rod 126 extending inwardly of the spacer 64 and is moveably positionable within the spacer 64 by linear movement thereof inwardly and outwardly of the main bore 22 based on the relative forces of the spring 140 and control pressure in the pilot piston bore 110 thereon. Referring to FIG. 4, where the bilateral sealing assembly 156, spacer 64, and portions of the adjacent valve components are shown enlarged from those of FIG. 1, bilateral sealing assembly 156 is a right annular sleeve or tube shaped structure having first and second opposed ends 158, 160 having corresponding first and second annular end faces 162, 164, each extending in a plane generally parallel to one another. A first outer sleeve wall 166 of a first diameter 186 or circumference extends from the outer circumferential edge of the first end face 162 in the direction of the second end face 164, a second outer sleeve wall 168 extends from the outer circumferential edge of the second end face 164 in the direction of the first end face 162, and has a second diameter 188 or circumference greater that the first diameter or circumference. A third outer sleeve wall 170 extends between the first and second outer sleeve walls 166, 168, and has a changing diameter or circumference in the length direction of the bilateral sealing assembly 156 greater than that of first outer sleeve wall 166 and less than that of second outer sleeve wall 168. A blend region 172 extends between the first and third outer sleeve walls 166, 170, which includes an undercut 174 and a taper frustoconical wall extending between third outer sleeve wall 170 and second outer sleeve wall 168. The first outer sleeve wall 166 is substantially longer in length than the length of the second and third outer sleeve walls 168, 170. The inner portion of the bilateral sealing assembly 156 includes a major bore 200 extending inwardly of the second end face 158 and terminating at a perforated web 202, through which extend a central retaining aperture 204 and a plurality of sleeve flow passages 206 extending from major bore 200 through the second end face 164 of the bilateral sealing assembly 156.

The relative dimensions of the spacer 64 and the bilateral sealing assembly 156 are configured to provide enhanced performance during switching of the valve 10 between communication of the source fluid and pressure at the second port 40 and the function port, and between the function port 42 and the third port 44 functioning as the vent port of a normally open valve 10. Thus, the first and second end portions 74, 76 of the spacer 64 include, at the first end portion 74, a first annular end wall 178 having a first inner diameter 180 (FIG. 4), and at the second end portion 76 a second annular end wall 182 having a second inner diameter 184. On the bilateral sealing assembly 156, the diameter 186 of the first outer sleeve wall 166 is less than the second inner diameter 184 of the spacer 64, and the diameter 188 of the second outer sleeve wall 168 (FIG. 4) is smaller than the first inner diameter 180 of the spacer 64. Additionally, the first inner diameter 180 of the spacer 64 is larger than the second inner diameter 184 thereof. The difference between the diameter 186 of the bilateral sealing assembly 156 and the second inner diameter 184 of the spacer 64, and between the diameter 188 of the second outer sleeve wall 168 of the bilateral sealing assembly 156 (FIG. 4) and the first inner diameter 180 of the spacer 64 is on the order of 0.030 inches. As a result, first annular gap 190 (FIG. 5) is present defining a first annular area between the first outer sleeve wall 168 and the adjacent portion of the inner circumferential surface of the spacer 64 when the bilateral sealing assembly 156 is positioned to cut off flow between the third port 44 functioning as the vent port and the function port 42 and allow fluid communication between the function port 42 and the second port 40 functioning as the source port, and serves as a first annular flow area as the bilateral sealing assembly 156 is moving toward or away from the second seal plate 146, and a second annular gap 192 (FIG. 6) is present defining a second annular area between the second outer sleeve wall 168 and the adjacent portion of the inner circumferential surface of the spacer 64 when the bilateral sealing assembly 156 is positioned to cut off flow between the second port 40 and the function port 42 and serves as a second annular flow area to allow communication between the function port 42 and the third port 44 or is moving toward the first seal plate 52 to do so, or away therefrom to reestablish that communication. As the bilateral seal assembly 156 is moving away from one of the seal plates 52, 146, an annular flow area generally disposed about the adjacent inner surface of the spacer 64 and the outer surface of the bilateral seal assembly 156 at the adjacent end face thereof is formed, and this annular flow area has a cross section smaller than the gap between the first or second annular end faces 162, 164 and the adjacent respective ones of the first or second seal plates 52, 146 against which they seal, over the majority of the stroke of the first or second annular end faces 162, 164 toward or away from the adjacent ones of the respective first or second seal plates 52, 146, and this first or second annular gap 190 or 192 is maintained constant so long as the adjacent end face of the bilateral sealing assembly is within the envelope of the immediately surrounding circumferential inner surface of the spacer 64 between the respective ones of the frustoconical walls 272 or 278 of the spacer 64 and the adjacent end of the spacer 64, or until the end face of the bilateral sealing assembly reaches the axial location of the frustoconical wall 272 or 278 of the spacer 64. In other words, between a seal plate and a plane extending across the intersection of first circumferential wall 270 and first frustoconical wall 272 or across the intersection of second circumferential wall 274 and second frustoconical wall 278. Where the valve is configured as shown in FIGS. 1 to 3 as a normally open valve, these annular flow areas limit the flow rate through the valve and thus the effective rate of closing off of flow through the valve to prevent a hard close where a rapid pressure drop is experienced downstream of the valve 10, and where the valve is configured as a normally closed valve where the vent and supply locations are switched, the annular flow areas limit the flow rate through the valve and thus the effective rate of opening of the valve 10 to prevent a high pressure spike downstream of the valve 10. Additionally, as the ends of the bilateral sealing assembly 156 can move beyond the plane extending across the intersection of first circumferential wall 270 and first frustoconical wall 272 or across the intersection of second circumferential wall 274 and second frustoconical wall 278 when moving away from the respective seal plate 52 or 146, after a certain travel distance set by the length of the first or second circumferential wall portions 270, 274 in the direction away from the seal plate 52 or 146 adjacent thereto, the portion of the inner wall of the spacer 64 tapers away from the adjacent end of the bilateral sealing assembly as movement away from the adjacent seal plate 52, 146 continues, resulting in an asymptotically increasing flow area between the end of the bilateral sealing assembly and the adjacent inner surface of the spacer 64 as the annular area through which fluid can flow increases by the square of the increasing outer diameter thereof, in other words of the adjacent surface of the frustoconical walls 272 or 278 of the spacer 64.

Figure 5:
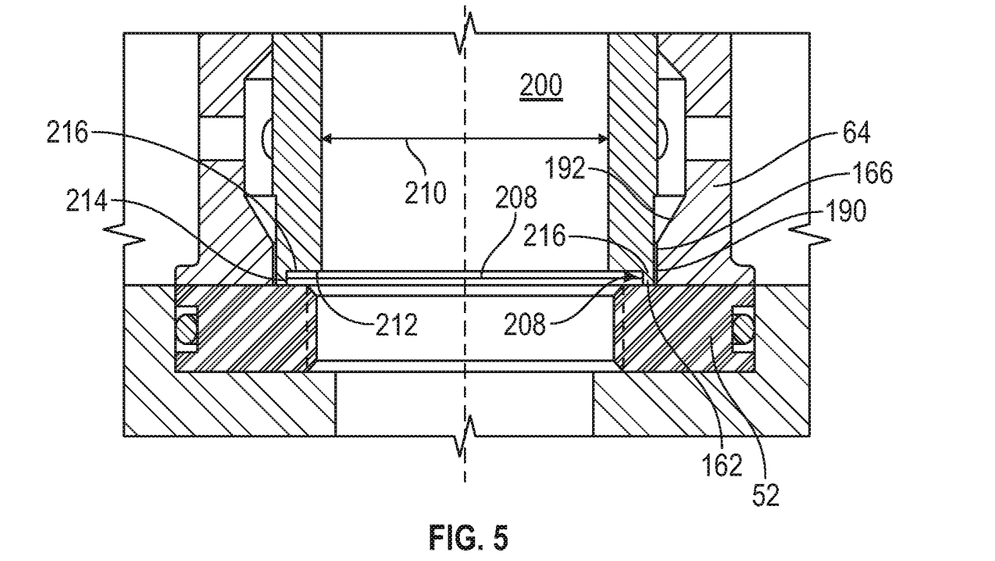
FIG. 5 is an enlarged sectional view of a portion of the valve, in the closed position.
Figure 6:
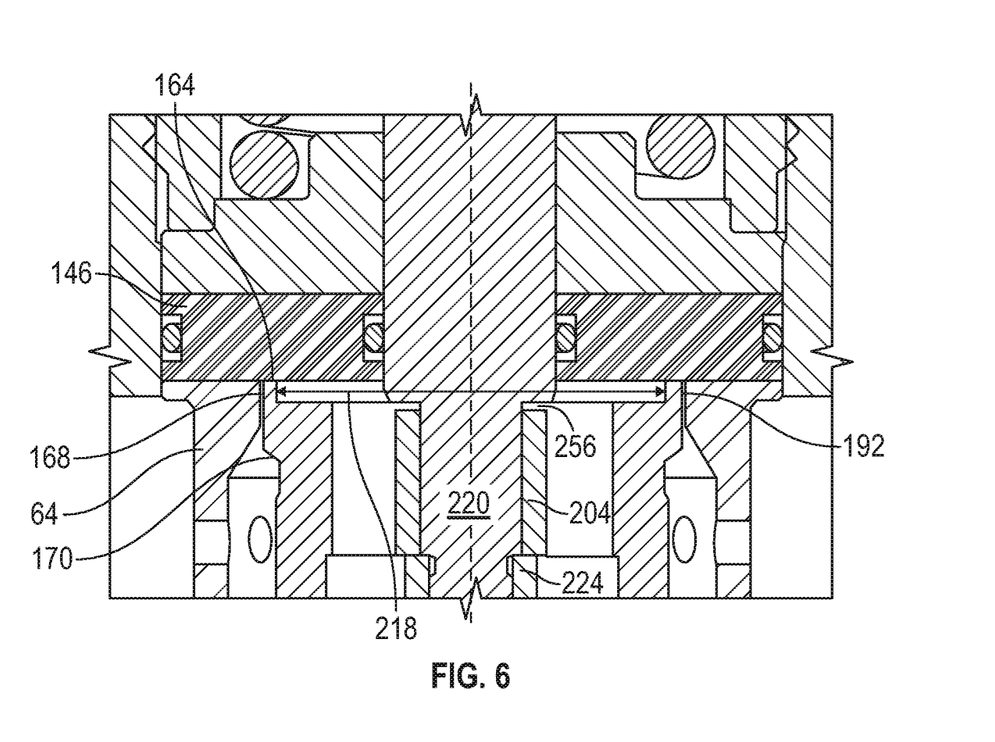
FIG. 6 is an enlarged sectional view of a portion of the valve, in the open position.

Referring to FIGS. 4 and 5, the configuration of the first annular end face 162 of the bilateral sealing assembly 156 and the cooperation thereof with the first seal plate 52 is shown. In the position of the bilateral sealing assembly 156 shown in FIGS. 3 and 5, the first annular end face 162 of the bilateral sealing assembly 156 contacts the facing surface of the first seal plate 52 and in conjunction with other seal rings such as those in the spacer 64, seals off fluid communication between the second port 40 serving as the source port and the function port, and allows fluid communication between the function port 42 and the third port 44 serving here as the vent port through the major bore 200 and sleeve flow passages 206 of the bilateral sealing assembly and second openings 88. The inner diameter 208 of the first annular end face 162 is greater than the major bore inner diameter 210, and an annular inner end face wall 212 extends radially outwardly from the first end side of the major bore 200, a circumferential recess wall 214 extends inwardly of the bilateral sealing assembly 156 from the first annular end face 162, and a radial blend 216 extends between the annular inner end face wall 212 and the adjacent end of the circumferential recess wall 214. Similarly as shown in FIGS. 1 and 6, when the second annular end face 164 of the bilateral sealing assembly 156 contacts the facing surface of the second seal plate 146 and in conjunction with other seal rings such as those in the spacer 64, it seals off fluid communication between the function port 42 and the third port 44 here serving as the vent port, and allows fluid communication directly through major bore 200 and sleeve flow passages 206 of the bilateral sealing assembly and first openings 86 and thus between the function port 42 and the second port 42 serving here as the source port where the valve is a normally open valve. As shown in FIG. 6, the second annular end face 164 has an inner diameter 218 greater than that of the inner diameter 210 of the major bore 200, and an annular recess volume extending round the portion of the piston rod 126 extending into the bilateral sealing assembly 156.

Referring again to FIG. 1, the guide rod 126 portion of the piston 120 connected to the bilateral sealing assembly 156 includes a first reduced diameter portion 220 extending inwardly of the central retaining portion 204 of the web 202, and a second reduced diameter portion 222 having a threaded outer cylindrical surface extending therefrom and inwardly of the major bore 200 of the bilateral sealing assembly 156 therefrom. A retainer 224 is threaded over the second reduced diameter portion 222 to secure the bilateral sealing assembly 156 to the piston rod 126.

Figure 7:
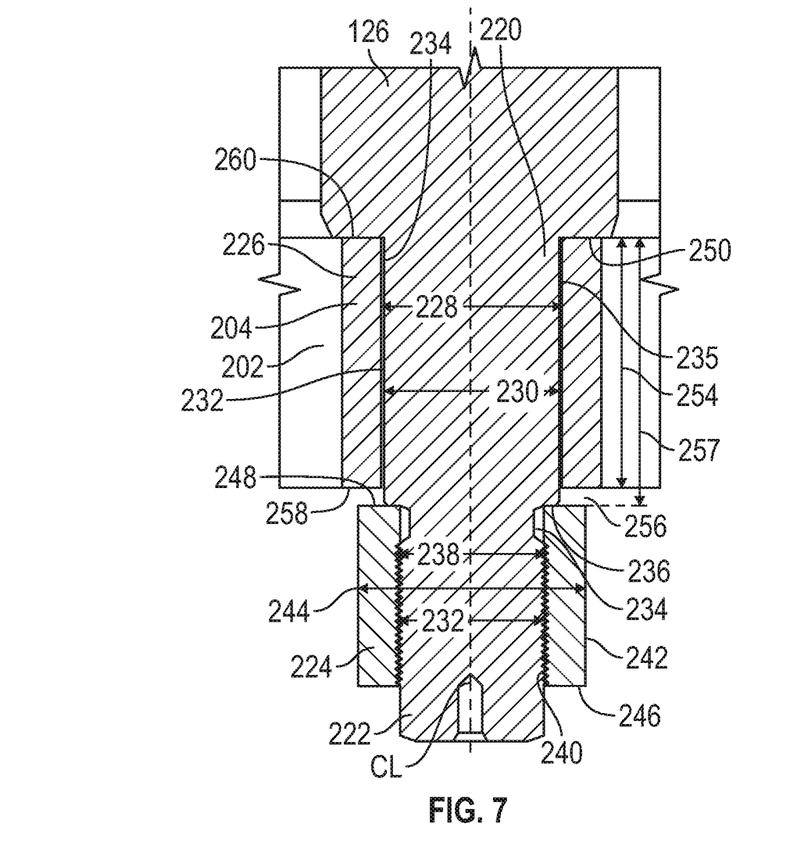
FIG. 7 is an enlarged sectional view of the connection of the control piston of the valve to the bilateral sealing assembly of the valve.

Referring to FIG. 7, details of the connection of the bilateral sealing assembly 156 to the piston rod 126 are shown. Web 202 includes a central circumferential portion 226 circumscribing the central retaining portion 204 thereof, wherein the inner wall of the central circumferential portion 226 has a retaining wall diameter or circumference 228. The outer diameter or circumference 230 of the second reduced diameter portion 222 of the piston rod 126 has a first reduced rod diameter or circumference 232, which is smaller than the outer diameter or circumference 230 of the first reduced diameter portion 220 of the piston rod 126, such that an alignment gap 235 extends there between. The retainer is 224 is secured on the second reduced diameter portion 222. These differences in the diameter or circumference of the surfaces results in the presence of an annular retainer ledge 236 at the second reduced diameter portion facing end of the first reduced diameter portion 220 of the piston rod 126, and an undercut region 234 is formed between the annular retainer ledge 236 of the first reduced diameter portion 220 and the second reduced diameter portion 222 of the piston rod 126. As the position of the centerline of the piston rod 126 and the central retaining portion 204 can, and likely will, change during use, the alignment gap 235 can be biased toward, or be larger on, one side of the piston rod versus another circumferentially opposed side thereof, and the first reduced diameter portion 220 of the piston 126 can contact the inner wall of the central retaining portion 204, centered with respect to the inner wall of the central retaining portion 204, or positioned therebetween. The second reduced diameter portion 222 of the piston rod 126 is threaded, and has an outer diameter (or circumference) 238 at any of the root, mean height, or peaks of the threads thereon which is smaller than the diameter (or circumference) 228 of the first reduced diameter portion 220, and terminates adjacent to the first reduced diameter portion 220 in the further reduced diameter undercut region 234. As a result of this configuration, the retainer ledge 236 is formed at the end of the first reduced diameter portion 220 at the undercut region 234 and extends radially outwardly from the undercut region 234 to approximately the diameter (or circumference) 228 of the first reduced diameter portion 220.

The retainer 224 secured on the second diameter portion 222 is a generally annular member having a threaded aperture extending therethrough, and may be configured as a right annular member, or a right annular member having flats, or as a nut having flats, such that it can be threaded over the threads of the reduced diameter portion 222 to secure the web 202 of the bilateral sealing assembly 156 to the piston rod 126. The retainer 224 includes an inner threaded circumferential surface 240 shown here threaded over the second reduced diameter portion 222 of the piston rod 126, an outer circumferential surface 242 having a maximum or minimum outer circumference or diameter 244, and opposed end walls 246, 248.

The end wall 248 of the retainer 224, when the retainer 224 is fully threaded into the second reduced diameter portion 222, bears against the retainer ledge 236, and a portion thereof extends circumferentially outwardly therefrom to a diameter or circumference greater than that of the circumference of the inner wall of the central circumferential portion 226 circumscribing the central retaining portion 204 of the web 202. Hence, the outer circumferential surface 242 of the retainer 224 extends radially outwardly past the inner circumference or diameter 228 of the central circumferential portion 226 of the web 202 circumscribing the central retaining portion 204 of the web 202, and thereby prevents the piston rod 126 from retracting out of the central retaining portion 204 of the bilateral sealing assembly 156 when moving in the upward direction of the page of FIG. 7.

At the juncture of the first reduced diameter portion 220 of the portion of the piston rod 126 extending inwardly of the opening in the second seal plate 146 and the first reduced diameter portion 222 of the piston rod 126, an annular web retainer ledge 250 extends therebetween. The span distance 252 between the annular web retainer ledge 250 and the retainer ledge 236 against which the retainer 224 bears is greater than the web length 254 (or depth) in the same direction as the span distance extends, and as a result a gap 256 is present between at least one of the distal end 258 of the central retaining portion 204 and the adjacent facing end wall 258 of the retainer 224, and between the proximal end 260 of the central retaining portion 204 and the adjacent facing portion of the annular web retainer ledge 250. Thus, a linear lost motion connection is provided between the web 202 and the piston rod 126, wherein the web 202, and thus the bilateral sealing assembly 156, can move linearly with respect to the piston 126. Here, the gap is shown between the distal end 258 of the central retaining portion 204 and the retainer, but because the first reduced diameter or circumference portion 220 of the piston rod 126 is free to move with respect to the web 202 by the length of the gap 256, when the piston 126 is moving to bias, or actually is biasing, the bilateral sealing assembly 156 against the first seal plate 52, central retaining portion 204 of the web 202 will bear against the annular web retainer ledge 250, and the gap is present between the distal wall 258 of the central retaining portion 204 and the retainer 224. When the piston 120 is moving the sliding sleeve 156 in the direction of, or biasing the sliding sleeve 156 against, the second seal plate 146, the piston 126 will pull the retainer 224 against the retaining surface 236 of the central retaining portion 204 gap 256 will be present between the annular web retainer ledge 250 and the proximal end 260 of the central retaining portion 204. In FIG. 7, the bilateral sealing assembly 156 is in the position thereof in FIG. 3, and is sealing against the first sealing plate 52, and thus the piston 126 is pushing the bilateral sealing assembly 156 thereagainst by the annular web retainer ledge 250 pushing against the proximal end 260 of the central retaining portion 204. Where the piston rod 126 has moved to block off the source port 42 from the vent port as shown in FIG. 1, the end wall 248 of the retainer engages against the proximal end wall 258 of the central retaining portion 204, and the gap 256 forms between the annular web retainer ledge 250 and the proximal end 260 of the central retaining portion 204.

The presence of the gap 256 allows the piston 126 to initially move with respect to the bilateral sealing assembly 156 when changing the valve 10 setting from a source open to vent and sealed from function condition, or vice versa. As a result, the piston 126 develops a slight amount of momentum before engaging one of the proximal and distal walls 258, 260 of the central retaining portion 204 via the annular retainer ledge engaging the distal wall 260 of the end wall 248 of the retainer 224 engaging the proximal end wall of the central retaining portion 204. Although the sealing plate assembly is guided by inner circumferential sleeve guide boss 84 along its linear reciprocating path, the gap 256, in conjunction with the alignment gap 235, also allows the bilateral sealing assembly 156 to tilt or cant slightly, as shown by angle α in FIG. 2, with respect to the piston rod 126 as it is in motion between opposed sealing plates 52, 146, or as it engages against and is in engagement with one of the sealing plates 52, 146, which prevents undue stress at the piston rod connection to the web 202 of the bilateral sealing assembly, or binding of the bilateral sealing assembly 156 within the guide bore due to a rigid attachment of the piston rod to the bilateral sealing assembly. Thus, where the centerline of the piston rod and the centerline of the spacer 64 are radially offset from one another, angularly offset from one another, or both, the gaps 256, 235 allow movement between the bilateral sealing assembly and the piston rod, and thus self-alignment of the bilateral sealing assembly 156 in the spacer 64, and with respect to the seal plates 52, 146, leading to more reliable valve operation and less wear and breakage thereof. Thus, even if the plane of the sealing surfaces of the bilateral sealing assembly 156, here the opposed first and second annular end faces 162, 164, are in a non-parallel relationship with the plane of the sealing surfaces of the respective sealing plates 52, 146 against which they engage, as the annular end face 162 or 164 engages against the appropriate sealing surface of the sealing plates 52, 146, the plane of the annular end face 162 or 164 can move into parallel alignment within the tolerances of the gaps 234, 256 and of the clearance between the outer surface of the bilateral sealing assembly 156 and the guide boss 84, and co-planarity with, the corresponding sealing surface of the corresponding seal plate 52 or 146.

Figure 7A:
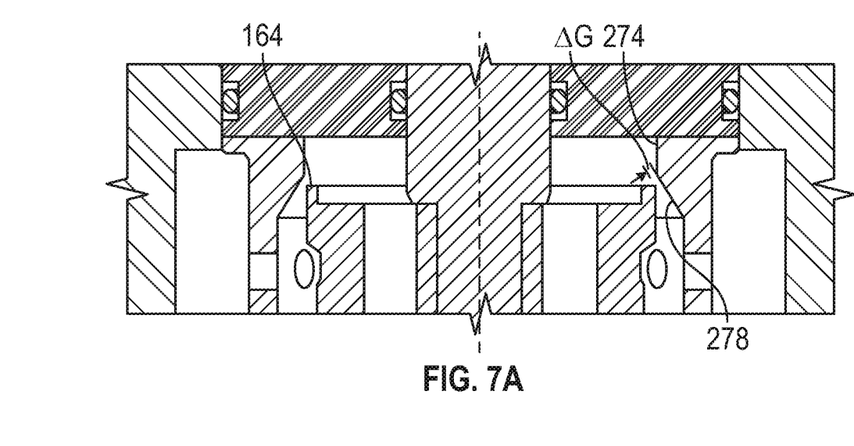
FIG. 7A is an enlarged sectional view of the bilateral sealing assembly of the valve spaced from the second seal plate thereof adjacent to the third port.
Figure 7B:
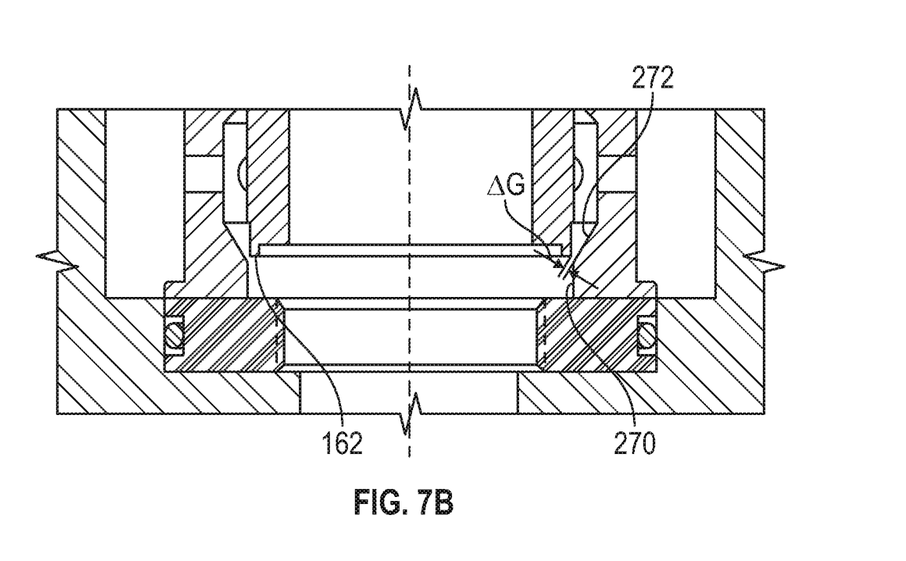
FIG. 7B is an enlarged sectional view of the bilateral sealing assembly of the valve spaced from the first seal plate thereof adjacent to the function and second.

Referring again to FIG. 4, as described previously herein, spacer 64 includes first and second inner circumferential recesses 80, 82 extending inwardly of the inner circumferential surface thereof. Here, the inner circumferential surface is generally circular in shape, and includes a first circumferential wall portion 270 extending inwardly of the inner bore of the spacer 64 from the second end wall 182 and has a second inner diameter 184, leading to a first frustoconical wall portion 272 extending further inwardly of the inner surface of the spacer 64. Similarly, a second circumferential wall portion 274 extends inwardly of the spacer 64 from the first annular end wall 178 and has a first annular inner diameter of second diameter 188, greater than the second annular inner diameter 184, leading to a second frustoconical wall portion 278 extending further inwardly of the inner wall of the spacer 64. Each of the first and second circumferential wall portions 270, 274 have a length 280, 282 respectively, over which the gap 190, 192 between the end of the first and second circumferential wall portions 270, 274 and the adjacent first and second outer sleeve walls 166, 168 of the bilateral sealing assembly 156 remains relatively constant, or which the bilateral sealing assembly 156 is cocked or canted with respect to the piston rod 126, over which the annular area across the gas remains relatively constant as one of the first and second outer sleeve walls 166, 168 moves away form, or toward and adjacent sealing surface of a seal plate 52, 146 and a region where the distance or circumferential area between the first and second outer sleeve walls 166, 168 changes as the outer ends of the first and second outer sleeve walls 166, 168 of the bilateral sealing sleeve moves within the circumference of the first and second frustoconical wall portions 272 274, past the plane of the planes extending across the intersections of the first and second circumferential walls 270, 274, and the adjacent ones of the first and second frustoconical wall portions 272, 278. As shown in FIGS. 7A and 7B, a gap ΔG is present which changes in size dependent upon the distance between the adjacent end of the bilateral sealing assembly 156 and the planes extending across the intersections of the first and second circumferential walls 270, 274, and the adjacent ones of the first and second frustoconical wall portions 272, 278, and thus an increasing flow area is achieved after a specific stoke distance of the bilateral sealing assembly 156 away from the adjacent sealing plate 52 or 146, following the period of a constant flow area.

Figure 8:
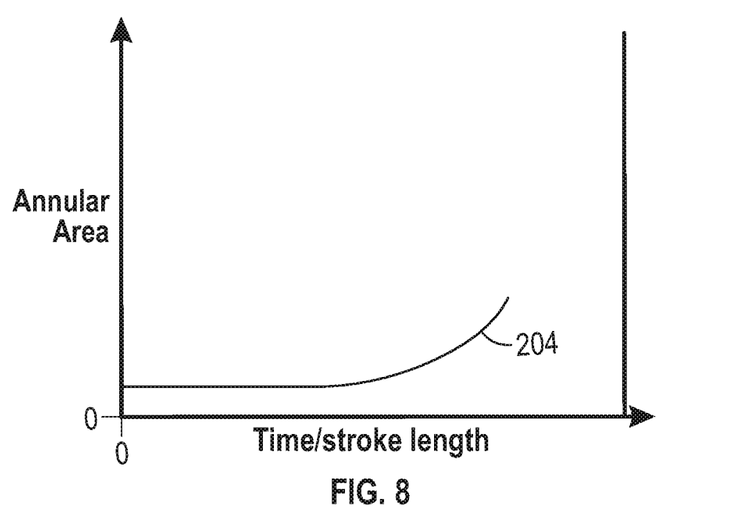
FIG. 8 is a graph showing the relationship between the annular area surrounding sleeve-like bilateral sealing assembly 156 and a surrounding portion of the cage as the valve opens from a closed state.

Referring to FIG. 8, a graph is provided showing the magnitude of the annular flow area located between one of the first and second outer walls 166, 168 of the bilateral sealing assembly 156 and the adjacent inner wall of the spacer 64 as the bilateral sealing assembly 156 moves from contact with one of the first and second seal plates and away therefrom. Here, it is assumed that the angle of the frustoconical wall portions 272, 274 and a projection of the plane of the first and second circumferential wall portions 270, 274 thereover is an acute angle. In FIG. 8, the solid line represents the annular area between the outer surface of the bilateral sealing assembly 156 and spacer inner surfaces 184, 272, 168, 278 that are adjacent to the respective ends of the bilateral sealing assembly 156 contacting or moving away from a sealing plate 52, 146 and an adjacent sealing surface of a seal plate 52, 146. The abscissa (x-axis) represents the distance the piston and bilateral sealing assembly 156 move in response to piston 126 movement.

The annular area between the outer surface of the bilateral sealing assembly 156 at the end thereof closest to a sealing plate and the adjacent inner surface of the spacer 64 remains constant until the end of the bilateral sealing assembly is located within the circumference of one of the frustoconical walls, after which the flow area (the annular area between the end of the sliding bilateral sealing assembly 156 being pulled away from a seal plate and the adjacent portion of the frustoconical surface of the first or second connection bore 24, 26) increases asymptotically.

Here, because the initial area for flow of the high pressure fluid from the first port 40 serving as the source port to the function port 42 is a very small annular area across a circumferential gap on the order of 0.030 inches, as the bilateral sealing assembly 156 moves away from the seal plate 52, the flow rate of the high pressure source fluid into the function port 42 is restricted for over approximately ¾ of the total available stroke of the bilateral sealing assembly 156, to allow the pressures in the source and function ports, and the flow lines (not shown) connected thereto, to become closer to each other and thus limit the rush, or high rate, of fluid flow inwardly of the function port 42 as well as limit pressure spiking thereat. Depending on the temperatures and pressures of the fluids present in the function and source ports before the bilateral sealing assembly 156 is backed off of the seal plate 52, the annular gap between the bilateral sealing assembly 156 and the spacer 64, and the surface finishes of the bilateral sealing assembly 156 and the seal plate 52, the fluid flow may be restricted such that a maximum flow rate of fluid is limited, or choked. In either event, the constant area for flow from the source port 42 to the function port allows a slow pressure transition compared to the valve of U.S. Pat. No. 5,771,931, and thus more controllable operation and less pressure spiking, and thus longer lifetimes of the valve 10 itself, and well as of components directly upstream and downstream therefrom, and more precise control of the operation of the valve to effectuate a desired operation therewith. After the end of the bilateral sealing assembly 156 is within the circumference of one of the frustoconical surfaces of one of the first and second connection bores 24, 26, further movement of the previously sealing plate contacting end of the bilateral sealing assembly 156 away from the previously contacting sealing plate results in an exponentially increasing flow area across connection bore gap 65 as shown in FIG. 1.

As the bilateral sealing assembly 156 is moving away from the first seal plate 52, it is simultaneously moving toward the second seal plate 146 at the same rate of travel. Thus, as the second annular end face 164 thereof passes within and under the circumference of the frustoconical surface of the second inner circumferential recess 82 of the spacer 64 closest to the second seal plate 146, the flow area through which the function port 42 fluid can communicate with the third port 44 is asymptotically reduced until the second annular end face 164 reaches the second circumferential wall portion 274 and is thus no longer within the circumference of the second connection bore 26, after which the flow area remains constant until the second annular end face 164 of the bilateral sealing assembly 156 reaches and engages against the second seal plate 146. When the second annular end face 164 contacts the second seal plate 146, the plane of the second annular end face 164 may be offset from parallel to the sealing surface of the second seal plate 146, and hence immediate complete sealing off of the third port 44 with the source port 42 may not occur. However, as the piston 126 is moving to close fluid communication between the function port 42 and vent port 44, the gap 256 is present between the proximal end 260 of the central retaining portion 204 and the adjacent facing portion of the annular web retainer ledge 250, and once the second annular end face 164 contact the second seal plate 146, the gap 256 is closed by further movement of the piston 126 while the second annular end face 164 of the bilateral sealing assembly 156 comes into parallel alignment with the seal plate 146 sealing surface. As a result of these changes in the fluid communication area available between the function port 42 and the third port 44, a gradual reduction of the communication area is achieved, resulting in smoother engagement of the bilateral sealing assembly 156 with the second seal plate 146, and thus more controllable operation, less pressure spiking, and thus longer lifetimes of the valve 10 itself, and well as of components directly upstream and downstream therefrom, and more precise control of the operation of the valve to effectuate a desired operation therewith as compared to the valve described in U.S. Pat. No. 5,771,931.

While the foregoing is directed to embodiments of the present invention, other and further embodiments of the invention may be devised without departing from the basic scope thereof, and the scope thereof is determined by the claims that follow.

What is claimed is:

1. A valve, comprising: a valve body comprising a first bore having a first seal plate and a second, opposed seal plate, therein, the first seal plate including a first seal plate opening therethrough; a first port in fluid communication with the first bore through the first seal plate opening; a second port in fluid communication with the first bore; a third port in fluid communication with the first bore, the second port disposed intermediate of the first and third ports; a bilateral sealing assembly comprising a tubular body having a first outer surface adjacent a first end face thereof, and a second outer surface adjacent a second end thereof opposite of the first end face; a spacer, including a second bore extending therethrough, received in the first bore and circumferentially surrounding the bilateral sealing assembly, the spacer comprising a first end thereof facing the first seal plate and a second end thereof facing the second seal plate; wherein the spacer includes a first inner cylindrical surface extending inwardly thereof from the first end thereof and a first tapered surface tapering outwardly in a direction away from the first inner cylindrical surface, and a second inner cylindrical surface extending inwardly thereof from the second end thereof and a second tapered surface tapering outwardly in a direction away from the second inner cylindrical surface; and with the first end face of the bilateral sealing assembly in contact with the first seal plate, a first annular gap, having a gap area, is present between the first outer surface of the bilateral sealing assembly and the first inner cylindrical surface of the spacer, the first annular gap extending away from the first seal plate with a constant gap area; an inner circumferential web having a web inner diameter and an annular circumferential web wall having opposed first and second web ends, the first and second web ends spaced from one another by a first length a piston having a piston rod having a first portion, a first reduced circumference portion extending through the inner circumferential web, and a second reduced circumference portion, wherein the first reduced circumference portion is disposed intermediate of the first portion and the second reduced circumference portion and extends through the inner circumferential web, and has a second length greater than a first length of the inner circumferential web an internally threaded sleeve having a first annular sleeve wall at a first end thereof and a second annular sleeve wall at a second end thereof, the first and second annular sleeve walls surrounding a sleeve through bore, the threads of the internally threaded sleeve engaged with threads of the second reduced circumference portion of a the piston rod, wherein, a length between the first and second annular sleeve walls is less than a length of the second reduced circumference portion between a second annular piston rod ledge and a distal end of the piston rod.

2. The valve of claim 1, wherein the first end of the spacer surrounding the bilateral sealing assembly contacts the first seal plate.

3. The valve of claim 1, wherein the first annular gap extends between a base wall of a circumferential recess extending inwardly of an outer surface of the bilateral sealing assembly from the first surface of the bilateral sealing assembly and a facing inner wall of the spacer.

4. The valve of claim 3, wherein the first cylindrical inner surface of the second bore of the spacer has a first length extending between opposed ends thereof, and the first tapered surface is a frustoconical surface having an increasing diameter in a direction away from the first inner cylindrical surface.

5. The valve of claim 4, wherein the bilateral sealing assembly comprises a second length, shorter than the first length, and a difference between the first and second lengths defining a maximum stroke of a sealing sleeve within the spacer bore.

6. The valve of claim 5, where the maximum stroke is greater than a distance from the frustoconical surface to the first end of the spacer.

7. The valve of claim 1, wherein the piston rod connected to the bilateral sealing assembly with a linear lost motion connection.

8. The valve of claim 1, wherein the spacer further comprises a circumferential guide bore therein.

9. The valve of claim 1, wherein the first reduced circumference portion has a first reduced circumference portion outer surface having a first reduced portion diameter, and the web inner diameter is greater than the first reduced portion diameter.

10. The valve of claim 9, wherein the internally threaded sleeve includes an outer wall having a sleeve outer wall diameter, and the sleeve outer diameter is greater than the web inner diameter.

11. The valve of claim 1, wherein:
the first reduced circumference portion has a first reduced circumference portion outer surface having a first reduced portion diameter; and
the internally threaded sleeve includes an outer wall having a sleeve outer wall diameter, and the sleeve outer diameter is greater than the first reduced portion diameter of the first reduced diameter portion of the piston rod.

12. A valve, comprising:
a valve body comprising a first bore having a first seal plate and a second, opposed seal plate, therein, the first seal plate including a first seal plate opening therethrough;
a first port in fluid communication with the first bore through the first seal plate opening; a second port in fluid communication with the first bore;
a third port in fluid communication with the first bore, the second port disposed intermediate of the first and third ports;
a bilateral sealing assembly comprising a tubular body having a first outer surface adjacent a first end face thereof, a second outer surface adjacent a second end face thereof opposite of the first end face, and an inner circumferential web having a first length, the first end face facing the first seal plate and the second end face facing the second seal plate;
an inner circumferential web having a web inner diameter and an annular circumferential web wall having opposed first and second web ends, the first and second web ends spaced from one another by the first length;
a piston having a piston rod having a first portion, a first reduced circumference portion extending through the inner circumferential web, and a second reduced circumference portion, wherein the first reduced circumference portion is disposed intermediate of the first portion and the second reduced circumference portion and extends through the inner circumferential web, and has a second length greater than the first length of the inner circumferential web;
the second reduced circumference portion having a threaded outer piston rod surface, a first annular piston rod ledge extending between the first portion and the first reduced circumference portion and a second annular piston rod ledge extending between the first reduced circumference portion and the second reduced circumference portion; and
an internally threaded sleeve having a first annular sleeve wall at a first end thereof and a second annular sleeve wall at a second end thereof, the first and second annular sleeve walls surrounding a sleeve through bore, the threads of the internally threaded sleeve engaged with the threads of the second reduced circumference portion of the piston rod, wherein,
the length between the first and second annular sleeve walls is less than the length of the second reduced circumference portion between the second annular piston rod ledge and a distal end of the piston rod.

13. The valve of claim 12, wherein the first reduced circumference portion has a first reduced circumference portion outer surface having a first reduced portion diameter, and the web inner diameter is greater than the first reduced portion diameter.

14. The valve of claim 13, wherein the internally threaded sleeve includes an outer wall having a sleeve outer wall diameter, and the sleeve outer diameter is greater than the web inner diameter.

15. The valve of claim 12, wherein:
the first reduced circumference portion has a first reduced circumference portion outer surface having a first reduced portion diameter; and
the internally threaded sleeve includes an outer wall having a sleeve outer wall diameter, and the sleeve outer diameter is greater than the first reduced portion diameter of the first reduced diameter portion of the piston rod.

16. The valve of claim 12, wherein the first annular sleeve wall of the internally threaded sleeve faces the second annular piston rod ledge, and the second annular sleeve wall is located between the second annular piston rod ledge and the distal end of the piston rod.

17. The valve of claim 16, wherein the first annular sleeve wall of the internally threaded sleeve faces the second annular piston rod ledge and a distance between the first annular piston rod ledge and the first annular sleeve wall is greater than the first length of the inner circumferential web.

18. The valve of claim 17, wherein the first annular sleeve wall contacts the second annular piston rod ledge.

19. The valve of claim 17, wherein the first annular sleeve wall is spaced from the second annular piston rod ledge.

20. The valve of claim 12, wherein the first annular sleeve wall of the internally threaded sleeve faces the second annular piston rod ledge, and the second annular sleeve wall is located between the second annular piston rod ledge and the distal end of the piston rod.

21. The valve of claim 20, wherein the first annular sleeve wall of the internally threaded sleeve faces the second annular piston rod ledge and a distance between the first annular piston rod ledge and the first annular sleeve wall is greater than the first length of the inner circumferential web.

22. The valve of claim 21, wherein the first annular sleeve wall contacts the second annular piston rod ledge.

23. The valve of claim 21, wherein the first annular sleeve wall is spaced from the second annular piston rod ledge.

* * * * *